United States Patent
Rothschiller et al.

(10) Patent No.: US 10,409,892 B2
(45) Date of Patent: Sep. 10, 2019

(54) FORMATTING DATA BY EXAMPLE

(75) Inventors: Chad Rothschiller, Edmonds, WA (US); Daniel Battagin, Bellevue, WA (US); Christopher Benedict, Bellevue, WA (US); Rodrigo Moreira-Silveira, Redmond, WA (US); Dmitri O. Danilov, Redmond, WA (US); Eric Cohen, Seattle, WA (US); Sumit Gulwani, Bellevue, WA (US); Dany Rouhana, Redmond, WA (US); Rishabh Singh, Cambridge, MA (US); Benjamin Goth Zorn, Woodinville, WA (US); Ramarathnam Venkatesan, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/014,520

(22) Filed: Jan. 26, 2011

(65) Prior Publication Data

US 2012/0192051 A1     Jul. 26, 2012

(51) Int. Cl.
G06F 17/00     (2019.01)
G06F 17/21     (2006.01)

(52) U.S. Cl.
CPC .................. G06F 17/211 (2013.01)

(58) Field of Classification Search
CPC .................................................. G06F 17/246
USPC .................. 715/212, 220, 200, 217
See application file for complete search history.

(56) References Cited

U.S. PATENT DOCUMENTS

| | | | | |
|---|---|---|---|---|
| 5,231,577 A | * | 7/1993 | Koss | 715/210 |
| 5,598,519 A | * | 1/1997 | Narayanan | 715/219 |
| 5,613,131 A | * | 3/1997 | Moss et al. | 715/236 |
| 5,621,875 A | * | 4/1997 | Mason et al. | 715/234 |

(Continued)

FOREIGN PATENT DOCUMENTS

| | | |
|---|---|---|
| CN | 1664810 A | 9/2005 |
| CN | 1696937 A | 11/2005 |

(Continued)

OTHER PUBLICATIONS

Walkenbach, Excel 2007 Bible, 2007, Wiley Publishing inc., pp. 421-440.*

(Continued)

*Primary Examiner* — Manglesh M Patel
(74) *Attorney, Agent, or Firm* — Merchant & Gould

(57) ABSTRACT

Data formatting rules to convert data from one form to another form are automatically determined based on a user's edits. A machine learning heuristic is applied to a user's edits to determine a data formatting rule that may be applied to data. For example, a user may make edits that add/remove characters from data, concatenate data, extract data, rename data, and the like. The machine learning heuristic may be automatically triggered in response to an event (e.g. after a predetermined number of edits are made to a same type of data) or manually triggered (e.g. selecting a user interface option). The data formatting rule may be applied to other data and the results of the formatting reviewable by the user. Based on further edits/reviews, the data formatting rule may be updated. The data formatting rules may be stored for later use.

20 Claims, 8 Drawing Sheets

(56) References Cited

U.S. PATENT DOCUMENTS

| | | | |
|---|---|---|---|
| 5,701,499 A | 12/1997 | Capson et al. | |
| 5,778,402 A * | 7/1998 | Gipson | G06F 17/21 715/201 |
| 5,805,158 A | 9/1998 | Bertram | |
| 6,038,567 A * | 3/2000 | Young | G06F 17/211 |
| 6,640,234 B1 * | 10/2003 | Coffen et al. | 715/219 |
| 6,662,340 B2 | 12/2003 | Rawat et al. | |
| 6,697,999 B1 | 2/2004 | Breuer | |
| 7,222,294 B2 * | 5/2007 | Coffen et al. | 715/217 |
| 7,305,129 B2 | 12/2007 | Chellapilla | |
| 7,343,551 B1 | 3/2008 | Bourdev | |
| 7,350,187 B1 | 3/2008 | Tong et al. | |
| 7,426,496 B2 | 9/2008 | Kristjansson | |
| 7,640,158 B2 * | 12/2009 | Detlef et al. | 704/235 |
| 7,689,904 B2 | 3/2010 | Ritter | |
| 7,707,486 B2 | 4/2010 | Genesereth et al. | |
| 7,827,483 B2 | 11/2010 | Unbedacht et al. | |
| 8,140,533 B1 | 3/2012 | Elmeleegy et al. | |
| 8,286,072 B2 * | 10/2012 | Chamberlain et al. | 715/215 |
| 8,510,373 B2 | 8/2013 | Demant et al. | |
| 8,600,916 B2 | 12/2013 | Chen et al. | |
| 8,645,825 B1 | 2/2014 | Cornea et al. | |
| 8,819,574 B2 | 8/2014 | Ouyang et al. | |
| 10,013,413 B2 | 7/2018 | Otero et al. | |
| 2001/0018696 A1 | 8/2001 | Hori et al. | 715/229 |
| 2002/0103825 A1 | 8/2002 | Bauchot | |
| 2003/0037033 A1 | 2/2003 | Nyman et al. | |
| 2004/0060001 A1 | 3/2004 | Coffen | |
| 2005/0132280 A1 * | 6/2005 | Broman et al. | 715/513 |
| 2006/0007466 A1 | 1/2006 | Ben-Yehuda et al. | 358/1.13 |
| 2006/0074866 A1 | 4/2006 | Chamberlain et al. | |
| 2006/0080594 A1 | 4/2006 | Chavoustie | |
| 2006/0136808 A1 * | 6/2006 | Chirilov | G06F 17/246 715/217 |
| 2007/0050352 A1 | 3/2007 | Kim | |
| 2007/0078872 A1 | 4/2007 | Cohen | |
| 2007/0101252 A1 * | 5/2007 | Chamberlain et al. | 715/503 |
| 2007/0106494 A1 | 5/2007 | Detleft | |
| 2007/0130263 A1 | 7/2007 | Li et al. | 709/206 |
| 2007/0220415 A1 | 9/2007 | Cheng et al. | |
| 2007/0250765 A1 | 10/2007 | Chen et al. | |
| 2008/0114758 A1 | 5/2008 | Rupp et al. | |
| 2009/0089653 A1 | 4/2009 | Campbell et al. | |
| 2009/0319542 A1 | 12/2009 | Le Brazidec et al. | |
| 2010/0083086 A1 * | 4/2010 | Berger et al. | 715/213 |
| 2010/0083087 A1 * | 4/2010 | Williamson | G06F 17/212 715/217 |
| 2010/0122152 A1 | 5/2010 | Chamberlain et al. | |
| 2010/0257145 A1 | 10/2010 | Felsheim | 707/692 |
| 2010/0257444 A1 * | 10/2010 | Bever et al. | 715/256 |
| 2010/0325173 A1 | 12/2010 | Haley et al. | |
| 2011/0010324 A1 | 1/2011 | Bolivar et al. | |
| 2011/0066933 A1 | 3/2011 | Ludwig | |
| 2011/0209048 A1 | 8/2011 | Scott et al. | |
| 2011/0320230 A1 | 12/2011 | Podgurny | |
| 2012/0260153 A1 * | 10/2012 | Bauchot | G06F 17/246 715/217 |
| 2013/0124962 A1 * | 5/2013 | Mitchell | 715/229 |
| 2013/0151939 A1 | 6/2013 | Proux et al. | |
| 2013/0191714 A1 | 7/2013 | Rothschiller | |
| 2013/0227031 A1 | 8/2013 | Wells | |
| 2014/0188925 A1 | 7/2014 | Skolicki | |
| 2014/0372857 A1 | 12/2014 | Otero et al. | |
| 2016/0055139 A1 * | 2/2016 | Creason | G06F 17/246 715/217 |
| 2016/0275066 A1 | 9/2016 | Otero et al. | |
| 2019/0073349 A1 | 3/2019 | Otero et al. | |

FOREIGN PATENT DOCUMENTS

| | | |
|---|---|---|
| CN | 101105814 A | 1/2008 |
| CN | 101158900 A | 4/2008 |
| CN | 101661512 A | 3/2010 |
| CN | 102968468 A | 3/2013 |
| EP | 2506155 A1 | 10/2012 |
| JP | 2004536369 A | 12/2004 |
| JP | 2006092520 A | 4/2006 |
| JP | 2009515253 A | 4/2009 |
| JP | 2009524174 A | 6/2009 |
| RU | 2439683 C2 | 1/2012 |
| TW | 498221 B | 8/2002 |
| TW | 561371 B | 11/2003 |
| TW | 200629146 A | 8/2006 |
| TW | 200939052 A | 9/2009 |
| WO | 02065330 A1 | 8/2002 |

OTHER PUBLICATIONS

Lowell Heddings, Using Conditional Cell Formatting in Excel 2007, published Aug. 18, 2008, howtogeek.com, pp. 1-11 (pdf).*
Eager, A., et al.; *Lixto Online Market Intelligence*—Published Jul. 2008; http://www.lixto.com/wp-content/uploads/2010/03/Butler_TechnologyAudit_2008.pdf; 9 pgs.
French, T., et al.; *Excel 2007 AutoFormat*—Retrieved Date: Oct. 19, 2010; About.com; http://spreadsheets.about.com/od/excelformatting/qt/090905-excel-autoformat.htm; 2 pgs.
Gulwani, S.; *Automating String Processing in Spreadsheets Using Input-Output Examples*; Microsoft Research, Redmond, WA, USA; PoPL'11; Jan. 26-28, 2011, Austin, TX, USA; 13 pgs.
Microsoft; *Use automatic formatting as you type*—Retrieved Date: Oct. 19, 2010; http://office.microsoft.com/en-in/excel-help/use-automatic-formatting-as-you-type-HP010082297.aspx?CTT=3; 3 pgs.
Oracle.com; *21 Data Cleansing and Correction with Data Rules*—Retrieved Date: Oct. 19, 2010; http://download.oracle.com/docs/cd/E11882_01/owb.112/e10935/data_cleansing.htm#CEGBEBDE; 10 pgs.
Rad, S.; *Conditional Formatting Rules Simplified*—Published Date: Apr. 22, 2010; http://blogs.msdn.com/b/excel/archive/2010/04/22/conditional-formatting-rules-simplified.aspx; 7 pgs.
Igarashi, et al., "Fluid Visualization of Spreadsheet Structures", In Proceedings of the IEEE Symposium on Visual Languages, Sep. 1998, pp. 118-125.
Leete, Mary, "Free Software: Autofilling Cells in OpenOffice.org Calc", Retrieved on: Nov. 9, 2011, Available at: http://www.dummies.com/how-to/content/free-software-autofilling-cells-in-openofficeorg-c.html.
International Search Report dated Jul. 27, 2012, in Appl. No. PCT/US2012/022454.
U.S. Appl. No. 13/358,033, filed Jan. 25, 2012, entitled "Fill by example animation and visuals".
Office Action dated Sep. 12, 2014, in U.S. Appl. No. 13/358,033.
Office Action dated Dec. 4, 2013, issued in CN Appl. No. 201210019215.9, w/translation.
Office Action dated Jan. 9, 2014, in U.S. Appl. No. 13/358,033.
"First Examination Report Received in New Zealand Patent Application No. 613143", dated Mar. 7, 2014, Filed Date: Jan. 24, 2012, 2 Pages.
"Excel Functions", Published on: Apr. 10, 2008, Available at: http://www.baycongroup.com/excel2007/03_excel.htm, 11, pgs.
Greathouse, Jim, "Combining and Splitting Data in Spreadsheets—Google Tech Tips", Published on: Nov. 17, 2011, Available at: https://sites.google.com/a/slu.edu/tips/home/combiningandsplittingdatainspreadsheets.
Haliestinson, "Flash-Fill in Microsoft Excel 2013", Published on: Apr. 16, 2013, Available at: http://blog.directionstraining.com/microsoft-excel/flash-fill-in-microsoft-excel-2013, 4, pgs.
Hanns, Susan, "Tips for Populating Cells in Excel Using Auto Fill", Published on: Jul. 14, 2011, Available at: http://ittrainingtips.iu.edu/excel/tips-for-populating-cells-in-excel-using-auto-fill/Jul. 2011, 2, pgs.
"International Search Report and Written Opinion Issued in PCT Application No. PCT/US2014/040202", dated May 29, 2015, 14 Pages.
Lowell, Heddings, "How to Use AutoFill on a Google Docs Spreadsheet", Published on: Apr. 28, 2010, Available at: http://www.howtogeek.com/howto/15799/how-to-use-autofill-on-a-google-docs-spreadsheet-quick-tips.

(56) References Cited

OTHER PUBLICATIONS

Mott, Elizabeth, "How to Auto Populate the Date in Excel", Retrieved on: Apr. 26, 2013, Available at: http://smallbusiness.chron.com/auto-populate-date-excel-40253.html, 3, pgs.
Nangpooh, "MS Excel Tutorial—Creating Custom Lists to Auto Fill Rows and Columns", Published on: Mar. 14, 2013, Available at: http://valvossa.info/?p=26, 4, pgs.
Stinson, et al., "Working with External Data", In Book-Microsoft Office Excel 2003 Inside Out, Chapter 29, Jan. 1, 2004, pp. 757-763.
"Using Excel's Autofill", Published on: Apr. 7, 2013, Available at: http://askaexcelninja.wordpress.com/2013/04/07/using-excels-autofill/, 3, pgs.
Office Action dated Apr. 8, 2015, in U.S. Appl. No. 13/358,033.
"Office Action Issued in Chile Patent Application No. 2093-2013", dated Mar. 13, 2015, 5 Pages. (w/o English Translation).
Office Action issued in Columbia Patent Application No. 13-176231, dated Jul. 9, 2014, 6 pages.
Notice of Allowance issued in Columbia Patent Application No. 13-176231, dated Oct. 22, 2014, 3 pages.
Notice of Allowance issued in Chinese Patent Application No. 201210019215.9, dated Feb. 3, 2015, 6 pages.
Notification Prior to Examination issued in Israeli Patent Application No. 227218, dated Jun. 8, 2015, 3 pages.
Australian First Office Action Issued in Patent Application No. 2012209157, dated May 5, 2016, 2 Pages.
Israel Notice of Allowance Issued in Israel Patent Application No. 227218, dated Jul. 4, 2016, 6 Pages.
Philippines Office Action Issued in Philippines Patent Application No. PH/12013/501506, dated May 5, 2016, 3 Pages.
U.S. Appl. No. 13/918,878, Final Office Action dated Jun. 20, 2016, 49 pages.
Russian Notice of Allowance Issued in Russian Patent Application No. 2013135003, dated Jun. 27, 2016, 10 Pages (w/o English Translation).
Australian Notice of Allowance Issued in Patent Application No. 2012209157, dated Jul. 7, 2016, 3 Pages.
Japanese Notice of allowance Issued in Patent Application No. 2013-551298, dated Sep. 26, 2016, without English Tramslation 3 Pages.
Russian Notice of Allowance Issued in Russian Patent Application No. 2013135003, dated Jun. 27, 2016, 16 Pages. (With English Translation).
U.S. Appl. No. 13/358,033, Office Action dated Sep. 13, 2016. 25 pages.
Office Action dated Sep. 29, 2015, in U.S. Appl. No. 13/918,878.
"Office Action Issued in Chile Patent Application No. 201302093", dated Oct. 14, 2015, 5 Pages. (w/o English Translation).
"Office Action Issued in New Zealand Patent Application No. 711979", dated Sep. 21, 2015, 2 Pages.
"Second Written Opinion Issued in PCT Application No. PCT/US2014/040202", dated Nov. 19, 2015, 7 Pages.
Office Action dated Dec. 18, 2015, in U.S. Appl. No. 13/358,033.
"International Preliminary Report on Patentability Issued in PCT Application No. PCT/US2014/040202", dated Jan. 18, 2016, 8 Pages.
"Office Action Issued in Russian Patent Application No. 2013135003", dated Nov. 30, 2015, 5 Pages. (w/o English Translation).
"Visualizing Data Using Conditional Formatting", In Excel 2007 Bible, 2007, 3 Pages.
"Office Action and Search Report Issued in Taiwan Patent Application No. 100149580", dated Apr. 29, 2014, 12 Pages.
"Office Action Issued in Taiwan Patent Application No. 100149580", dated Sep. 18, 2014, 7 Pages.
"Second Office Action Issued in Chinese Patent Application No. 201210019215.9", dated Jul. 22, 2014, 10 Pages.
"Office Action Issued in Philippines Patent Application No. PH/1/2013/501506", dated Aug. 19, 2014, 2 Pages.
"Check Out New Functions of Office 2000, I've Got It! Office 2000", Nikkei BP Soft Press, Japan, May 1, 1999, pp. 82-90. (W/o English Translation).
"Office Action Issued in Japanese Patent Application No. 2013-551298", dated Feb. 29, 2016, 8 Pages.
"Office Action Issued in Israel Patent Application No. 227218", dated Feb. 14, 2016, 2 Pages.
New Zealand Notice of allowance Issued in New Zealand Patent Application No. 711979, dated Mar. 7, 2017, 1 Page.
Taiwan Notice of allowance Issued in Taiwan Patent Application No. 100149580, dated Dec. 28, 2016, 4 Pages. With english trans.
U.S. Appl. No. 13/918,878, Office Action dated Nov. 16, 2016, 38 pages.
U.S. Appl. No. 13/358,033, Office Action dated Mar. 28, 2017. 21 pages.
U.S. Appl. No. 13/358,033, Office Action dated Sep. 11, 2017, 19 pages.
U.S. Appl. No. 15/171,895, Office Action dated Sep. 11, 2017, 21 pages.
Gregory, Text to Columns in Excel, Jul. 13, 2010, Excel Semi-Pro, pp. 1-5. Retrieved: http://excelsemipro.com/2010/07/text-to-columns-in-excel/.
Chinese First Office Action dated Aug. 2, 2017, issued in CN Appl. No. 201480045301.4, 5pgs. w/translation.
U.S. Appl. No. 13/918,878, Final Office Action dated Jun. 1, 2017, 34 pages.
"Office Action Issued in Malaysian Patent Application No. PI2013701301", dated Aug. 15, 2017, 3 Pages.
"Office Action issued in Canadian Patent Application No. 2,824,922", dated Dec. 8, 2017, 4 Pages.
"Extended European Search Report in Patent Application No. 12739249.6", dated Jan. 4, 2018, 8 Pages.
Notice of Allowance Issued in Malaysian Patent Application No. PI2013701301, dated Mar. 30, 2018, 2 Pages.
"Office Action Issued in Korean Patent Application No. 1020137019749", dated May 13, 2018, 6 Pages.
"Office Action Issued in Chinese Patent Application No. 201480045301.4", dated Jun. 20, 2018, 13 Pages.
"Office Action Issued in Argentina Patent Application No. P120100249", dated Jul. 25, 2017, 5 Pages.
"Office Action Issued in Korean Patent Application No. 10-2013-7019749", dated Nov. 27, 2018, 6 Pages.
"Non Final Office Action Issued in U.S. Appl. No. 13/358,033", dated Oct. 4, 2018, 20 Pages.
U.S. Appl. No. 13/358,033, Office Action dated Mar. 16, 2018, 21 pages.
U.S. Appl. No. 15/171,895, Notice of Allowance dated Feb. 22, 2018, 5 pages.
U.S. Appl. No. 13/918,878, Office Action dated Mar. 5, 2018, 28 pages.
"Office Action Issued in Indian Patent Application No. 5244/CHENP/2013", dated Jan. 29, 2019, 7 Pages.
"Final Office Action Issued in U.S. Appl. No. 13/358,033", dated May 2, 2019, 20 pages.
"Third Office Action Issued in Chinese Patent Application No. 201480045301.4", dated May 5, 2019, 20 pages.
"Non Final Office Action issued in U.S. Appl. No. 16/178,212", dated Jun. 26, 2019, 33 Pages.

* cited by examiner

FORMATTING DATA BY EXAMPLE

BACKGROUND

The same type of data is often entered and stored in many different formats. For example, some dates are in the form CCYYMMDD (19990101), other dates in the format of MM/DD/CCYY (01/01/1999), yet other dates in the format of M/D/YY (1/1/99). To perform analysis on the data, it is converted to the same format. For example, some analysis may specify that phone numbers are to be formatted following the form (206) 555-1212, whereas other analysis may specify that formatting be removed from the phone numbers (i.e. 2065551212). Different methods may be used to transform the data. For example, different transformation functions may be used and/or code may be developed to transform the data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Data formatting rules to convert data items from one form to another form are automatically determined based on an example set of outputs, e.g. a user's edits. A machine learning heuristic is applied to source data as well as example outputs, (e.g. a user's edits) to determine a data formatting rule that may be applied to additional data items. For example, a user may make edits that add/remove characters from data, concatenate data, extract data, rename data, and the like. By examining the original values along with the edited values, a rule can be derived that encapsulates this type of transform, and then that rule can be run on additional original values to automatically generate the desired edited values or outputs. The machine learning heuristic may be automatically triggered in response to an event (e.g. after a predetermined number of edits are made to a same type of data) or manually triggered (e.g. selecting a user interface option). The data formatting rule may be applied to other data and the results of the formatting reviewable by the user. Based on further edits/reviews, the data formatting rule may be updated. The data formatting rules may be stored for later use and/or modification. A confidence level may also be presented to assist a user in determining if an item(s) has been reformatted correctly.

DETAILED DESCRIPTION

Figure 1:
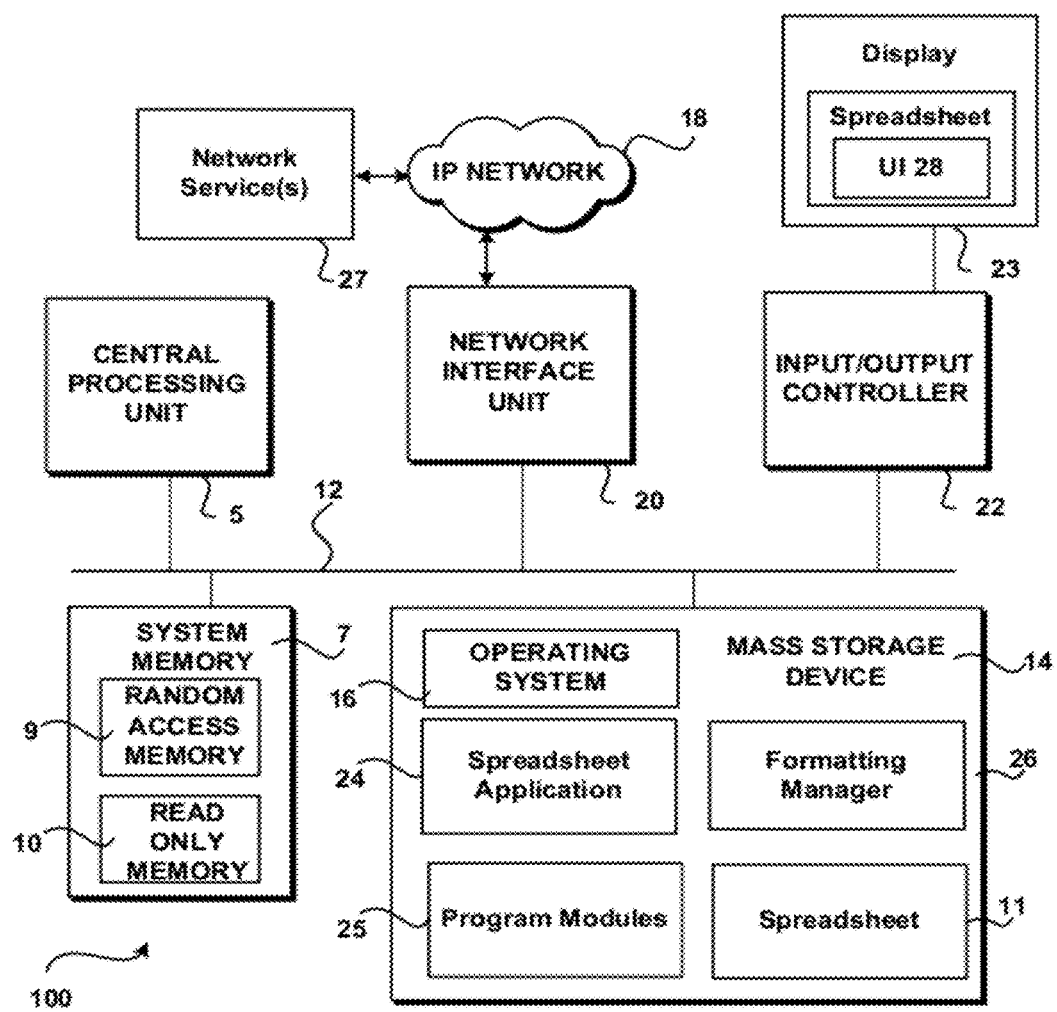
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, spreadsheet 11, spreadsheet application 24, other program modules 25, and formatting manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems, such as network service(s) 27. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone, a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs, including a spreadsheet application 24 and program modules 25. According to an embodiment, the spreadsheet application 24 is the MICROSOFT EXCEL spreadsheet application. Other spreadsheet applications may also be used. A user interface, such as UI 28, allows a user to interact with an application, such as spreadsheet application 24.

Formatting manager 26 may be located externally from spreadsheet application 24 as shown or may be a part of spreadsheet application 24. Further, all/some of the functionality provided by formatting manager 26 may be located internally/externally from spreadsheet application 24.

Formatting manager 26 is configured to generate one or more data formatting rules to convert data from one form to another form based on original data and example outputs, for example a user's edits. According to an embodiment, formatting manager 26 applies a machine learning heuristic to the original data as well as example outputs a user's edits to determine the data formatting rule(s) that may be applied to data. For example, a user may make edits that add/remove characters from data, concatenate data, extract data, rename data, and the like. In response to the edits, a data formatting rule(s) is generated that is applied to other data within the document (e.g. a spreadsheet). The formatting that is applied to the data may be reviewable by the user such that the user may accept/reject changes. The formatting that is applied to the data may also comprise metadata formatting. According to an embodiment, a confidence level determined from the formatting rule is associated with the formatting that is applied to the data such that a user may more easily discern when the data is properly reformatted. For example, a high confidence level indicates that it is likely that the data is properly formatted, whereas a lower confidence level may indicate a user may wish to review the results. The machine learning heuristic may be automatically triggered in response to an event (e.g. after a predetermined number of edits are made to a same type of data) or manually triggered (e.g. selecting a user interface option). Based on further edits/reviews, the data formatting rule may be updated. The data formatting rules may also be stored for later use and/or modification. For example, a user could modify the rule (e.g. a script) such that application of the data formatting rule follows the modified rule.

Figure 2:
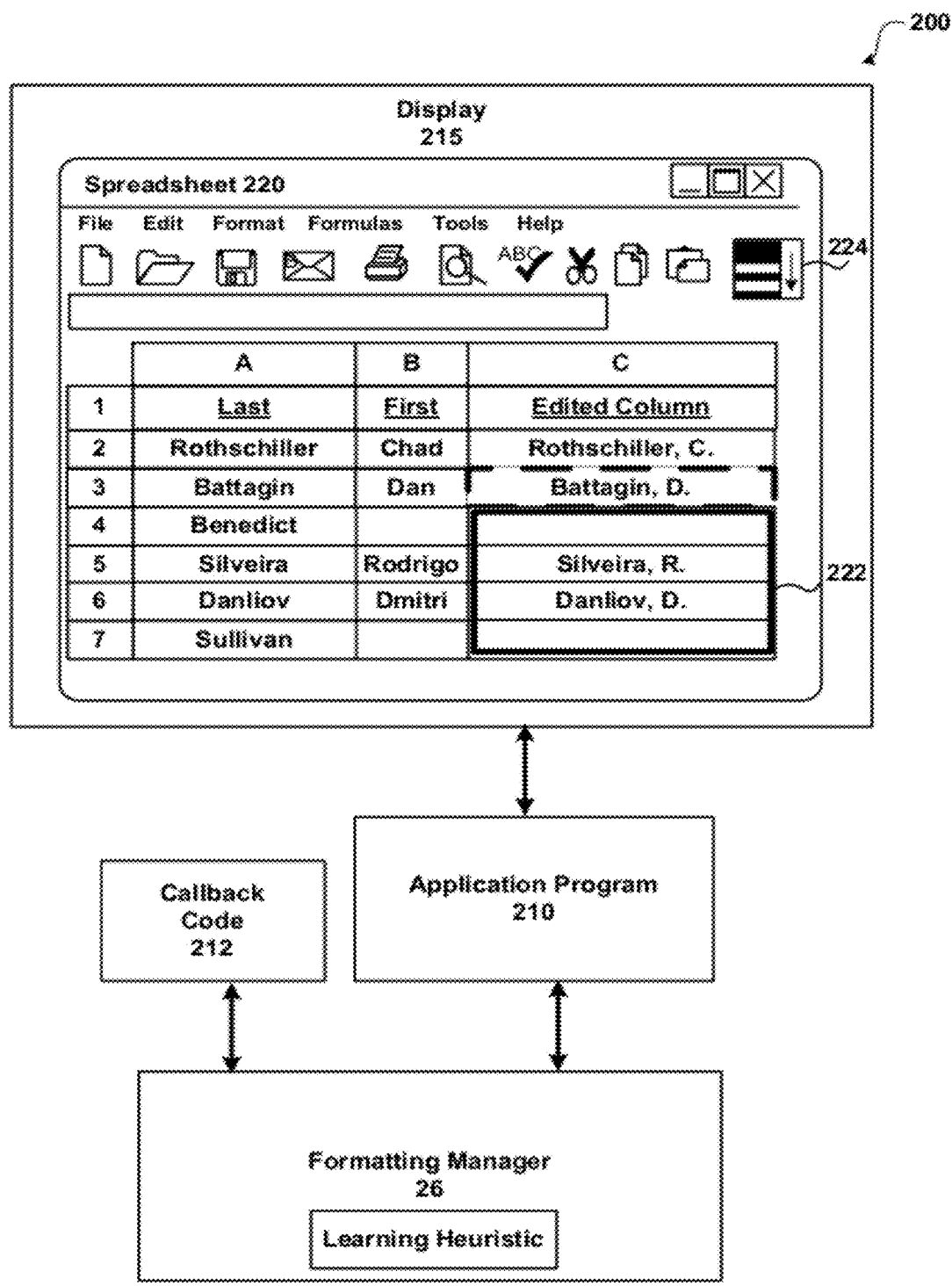
FIG. 2 shows a system for formatting data based on edits made to a document.

FIG. 2 shows a system for formatting data based on edits made to a document. As illustrated, system 200 includes formatting manager 26, application program 210, callback code 212, and display 215. The computing device(s) used may be any type of computing device that is configured to perform the operations relating to automatically formatting data based on a user's edits to a document. For example, some of the computing devices may be: mobile computing devices (e.g. cellular phones, tablets, smart phones, laptops, and the like); desktop computing devices and servers.

In order to facilitate communication with formatting manager 26, one or more callback routines, illustrated in FIG. 2 as callback code 212 may be implemented. According to one embodiment, application program 210 is a spreadsheet application.

Display 215 is configured to display a document, such as spreadsheet document 220, and user interface elements used to interact with a document. As illustrated, spreadsheet 220 shows three columns including a last name column (A), a first name column (B) and an edited column (C). In the current example, a user has made edits to the edited column. In cell C2, the user has entered for that row, row 2, the last name (that is also contained in cell A2), followed by a comma, that is followed by the first initial (that is also contained in cell B2). In cell C3, the user has entered for that row, row 3, the last name (that is also contained in cell A3), followed by a comma, that is followed by the first initial (that is also contained in cell B3).

Generally, formatting manager 26 detects when the user is editing/modifying data that fits a pattern that can be filled down and applied to additional data in the spreadsheet, and automatically fills down the column with the results that are obtained from applying the data formatting rule. In response to the edits, formatting manager 26 uses information that is associated with the edits to obtain a data formatting rule that is applied to other data within the spreadsheet. According to an embodiment, the information includes output examples that result from the edits to the text that is displayed within the edited cells (e.g. cells C2 and C3) and input examples that are associated with the edits. In this case, column A and column B include input examples that are related to the edited column (e.g. cells A2 and B2 is an input example for the output example C2 and cells A3 and B3 is an input example for the output example C3). These input/output examples are determined by formatting manager 26 and are supplied to a process that generates a data formatting rule for other similarly formatted cells (e.g. cells C4:C7 (222)). The machine learning heuristic obtains the set of input/output examples, determines a pattern, generates a data formatting rule, and then formatting manager 26 applies the data formatting rules to an output range to generate newly formatted values. According to an embodiment, an exemplary machine learning heuristic is described in "Automating String Processing in Spreadsheets Using Input-Output Examples," by Sumit Gulwani, PoPL '11, Jan. 26-28, 2011, Austin, Tex. Other machine learning heuristics may be utilized. Generally, any heuristic that takes original data as well as data edits as input and produces a data formatting rule that may be applied to other data to result in similarly formatted data may be used. According to an embodiment, the functionality of the machine learning heuristic is included within formatting manager 26. The functionality may also be located in other locations.

Formatting manager 26 automatically applies the data formatting rule to other cells within the spreadsheet that are similarly formatted. According to an embodiment, the data formatting rule is automatically applied to an output range of cells that fill down the column of the edited column. In the current example, the output range includes cells C4:C7. Box 222 shows that application of the data formatting rules to cells C4:C7 resulted in values being placed within cells C5 and C6. According to an embodiment, the data formatting rule that is applied to the output range is dynamic. In other words, when a value is edited within the output range, the data formatting rule is updated using the additional input/output example(s).

The data formatting rule may generate zero or more values for each of the cells. For example, a value is not returned for cells C4 and C7 since there is not a first name in the corresponding cell of the B column. More than one potential result may be generated by the data formatting rule when the data formatting rule is not sure of the result. According to an embodiment, before automatically reformatting data, the data formatting rule is applied to a predetermined number of cells to determine whether application of the formatting rule is generating results that meet or exceed a predetermined confidence level threshold. For example, if application of the formatting rule to the predetermined number of cells results in a low confidence level, the data formatting rule is not automatically applied. According to an embodiment, the data formatting rule is applied to the cells in the output range and a percentage of cells that have one answer is determined. According to an embodiment, the percentage of cells that have zero answers are excluded from the calculation. When the percentage is above a predetermined threshold (e.g. 70%) the cells in the output range are automatically filled down using the results provided by the data formatting rule. When the threshold is not met, the results may not be applied to the cell and more edits are obtained before creating a new data formatting rule or the results may be applied and the cell and an indicator (e.g. highlighting, formatting) may be applied to the cell that indicates the confidence level is below the threshold. A unique result generated by application of the data formatting rule to the cell is a good indicator that the data formatting rule is generating accurate results. Other thresholds and/or rules may be used to determine whether the data formatting rule is generating accurate results.

Many types of data formatting rules may be created based on a user's edits. For example, a concatenation of two columns, extracting information from a column (e.g. extracting a top level domain name from an address, extracting an email address) and the like. Generally, a data formatting rule may be calculated based on any editing activity. In some cases, more than two input/output examples may be used to generate accurate results. For example, the machine learning heuristic may only be 50% accurate with two examples and be 95% accurate using three examples.

A data formatting rule may also be obtained based on a selection within a user interface (e.g. icon 224) or some other menu option may be selected. The example edits may be manually selected by a user (e.g. the user selects example cells) and/or the examples may be automatically determined by formatting manager 26. For example, formatting manager 26 may look at data and determine input/output examples from the data (e.g. a column with the least number of values may be considered as the output column, and the remaining columns may be considered as input columns).

FIGS. 3-6 show examples of formatting cells based on a user's edits.

Figure 3:
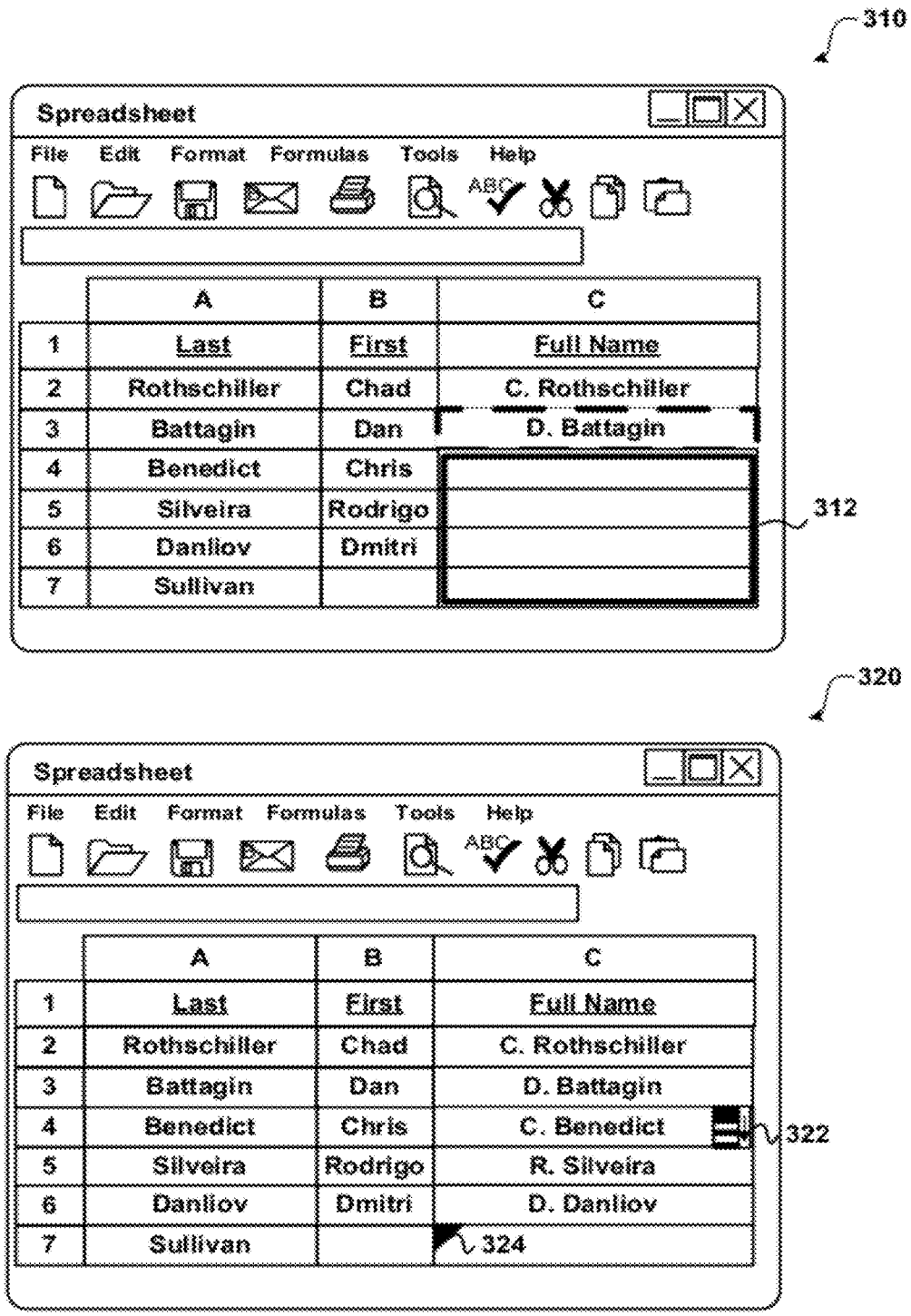
FIG. 3 illustrates determining a data formatting rule based on a user's edits to a column and applying the data formatting rule to other cells within the column.

FIG. 3 illustrates determining a data formatting rule based on a user's edits to a column and applying the data formatting rule to other cells within the column. As illustrated, a user is making edits to the Full Name column (C) of spreadsheet 310. In the current example, the user has typed a first initial followed by a period and a space that is followed by the last name. The last name is contained in column A of spreadsheet 310 and the first initial is contained in column B of the spreadsheet. In response to the user making the edits to cells C2 and C3, a data formatting rule is generated by a machine learning heuristic that may be applied to other cells within the document.

In the current example, the input/output examples include the text in the C column and the text in the A and B columns for each row that was edited. The input data may be determined by scanning the document to locate data that may be used in application of the data formatting rule to create the desired result. In this case, the data formatting rule creates a rule that obtains the first initial from column B and the last name from column A, as well as inserts a period character and space character after the first initial. The output range 312 indicates the cells to which the data formatting rule is to be applied.

Referring to spreadsheet 320 it can be seen that the automatic application of the data formatting rule has resulted in cells C3:C6 being filled in with a name that includes a first initial that is followed by a period and a space that is followed by a last name. Cell C7 was not filled in since application of the data formatting rule did not result in an accurate result since the first name column is empty.

Spreadsheet 320 also shows a reviewing user interface element 322 that may be used to accept/reject a change made by the application of the data formatting rule. An error user interface element 324 is also placed near the location of where the data formatting rule was not applied (in this case missing data from the First column) or where application of the data formatting rule may not be determined to be accurate (See FIG. 6 and related discussion for more discussion regarding the reviewing user interface element and the error correction user interface element).

Figure 4:
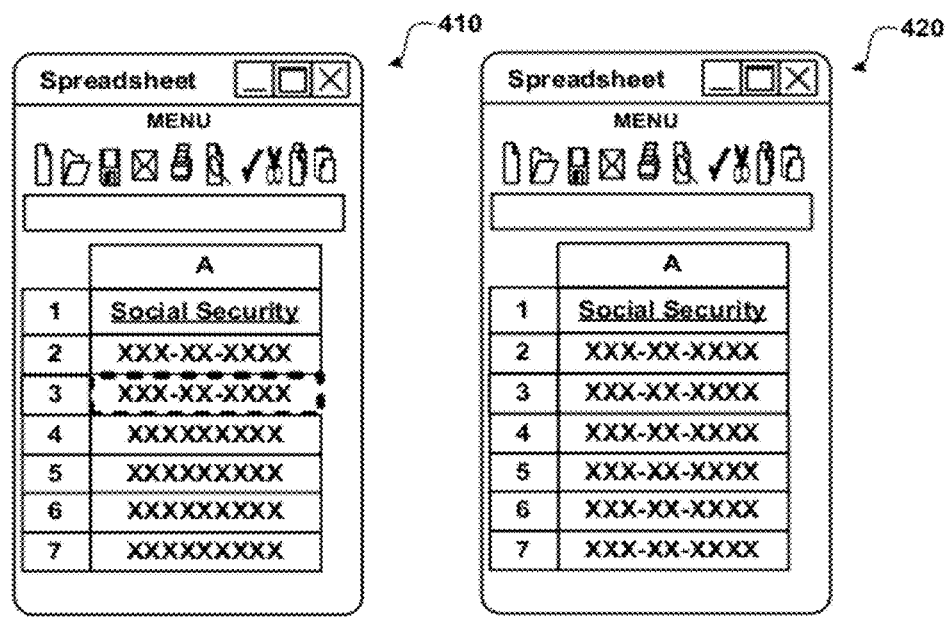
FIG. 4 shows an example of a user making edits to the items in the social security number column.

FIG. 4 shows an example of a user making edits to the items in the social security number column. The user has changed the formatting of the social security number from the format "XXXXXXXXX" to "XXX-XX-XXXX" (where X is any numeral, 0-9). In other examples, the characters may include non-numerical characters. According to an embodiment, after a user has made two or more edits the input/output examples are used by the formatting manager to generate the data formatting rule that is applied to the other data in the column. In the current example, the input examples are the original text that was contained in cells A2 and A3 and the output examples are the edited text shown in cells A2 and A3. More or fewer edits may be collected before submitting the input/output examples. For example, in some cases (such as this one) one input/output example may be sufficient to generate an accurate data formatting rule. In more complex editing scenarios, more input/output examples may be used. Further, any additional edits made by the user may be used by the formatting manager to update the data formatting rule. Application of the data formatting rule to cells A4:A7 result in the spreadsheet as illustrated by display 420. According to an embodiment, cells that already contain data are not changed automatically. Instead, a user may be requested to affirmatively accept the proposed changes before they are made to the cells containing data. The cells may be also be changed automatically and the user provided with an opportunity to undo the changes.

Figure 5:
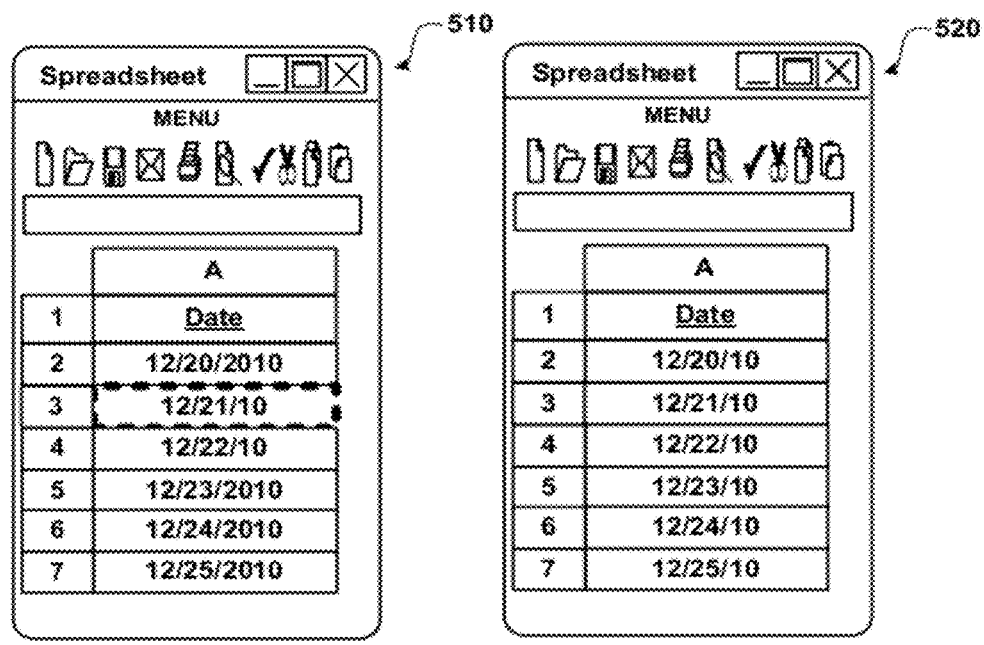
FIG. 5 illustrates an example of a user making edits to change the formatting of dates.

FIG. 5 illustrates an example of a user making edits to change the formatting of dates. The user has changed the formatting of two dates in spreadsheet 510 from the format "MM/DD/CCYY" to "MM/DD/YY."

In the current example, the user has changed the formatting of the dates in cells A4 and A3. The input examples includes the original text in cells A3 and A4 and the output examples includes the edited text as illustrated in cells A3 and A4 of display 520. Application of the generated data formatting rule results in display 520. As shown, the edits may be made anywhere within similarly formatted data and application of the data formatting rule may not only fill down as illustrated in FIGS. 2-4 but also be applied to other cells (e.g. cell A2).

Figure 6:
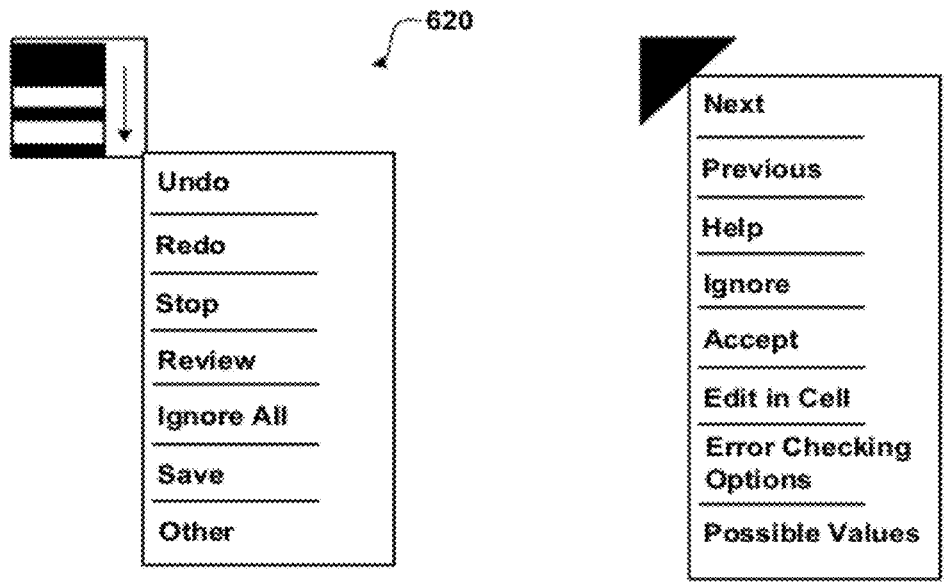
FIG. 6 shows user interface elements that may be used to interact with the formatting of items.

FIG. 6 shows user interface elements that may be used to interact with the formatting of items. As illustrated, spreadsheet 610 shows reviewing user interface elements 612 and 618 and error correction user interface elements 614 and 616.

A cell may be marked with an error correction user interface element when the cell is flagged as having a value that is inconsistent and/or not determined to be accurate. According to an embodiment, a cell with inconsistent data means that the cell's value either does not match what the data formatting rule would have generated or the value within the cell was generated by the data formatting rule, but there is more than one possible result. As soon as the data formatting rule has been applied to the determined output range, any results that are inconsistent are flagged. According to an embodiment, a result is considered inconsistent when the number of possible results was more or less than one result (e.g. no results or 2 or more results provided by the data formatting rule) or the pre-existing value is inconsistent with the result provided by the data formatting rule. Other heuristics may also be used. For example, a result may be considered inconsistent when the number of results exceeds a predetermined number of results and/or some other condition.

The error correction user interface element may be selected. When selected, the error correction user interface element displays various selectable options (630). According to an embodiment, the selections include a next option, a previous option, a help option, an ignore option, an accept option, an edit in cell option, an error checking option and a possible values option. More or fewer options may be included within menu 630. The next option moves to the next cell that is marked as an error. The previous option moves to the previous error. The help option provides a help display. The ignore option ignores the current error and removes the error correction user interface element from the display. The accept option removes the error condition and adds the associated input/output example for the cell to generate a new data formatting rule. The edit in cell option places the user into an edit mode on the cell. When the user edits one or more of those error cells then the edit is treated as an input/output example, and a new/updated data formatting rule is computed. According to an embodiment, the updated data formatting rule is applied to the remaining error cells that are related to the data formatting rule. The error checking option provides the user with various options relating to error checking. The possible values option when selected displays a list of other possible values for the cell when reformatted. For example, each result that is generated by the data formatting rule may be displayed.

The reviewing user interface element 612 presents various options to interact with the cells that have been formatted using the data formatting rule. According to an embodiment, the reviewing menu 620 comprises an undo option, a redo option, a stop option, a review option, an ignore all option, a save option, and an other option. More or fewer options may be included in menu 620. The undo operation reverts the document (e.g. the column of the document to which the data formatting rule was applied) to the state it was immediately before applying the data formatting rule to the cells. The redo option restores the data in the cells that was previously undone by the user. The stop option disables the automatic behavior of the automatic fill down of applying the data formatting rule. The review option sets the active cell to be the first cell in the current conversion range (e.g. the output range) with an error tag. The ignore all option removes the error tags and any related error formatting from the cells in the current fill down range. The save option allows a user to save the current data formatting rule. The save option saves information relating to the rule, such as column(s) that may be input as well as any input/output examples. The other option provides other options.

Figure 7:
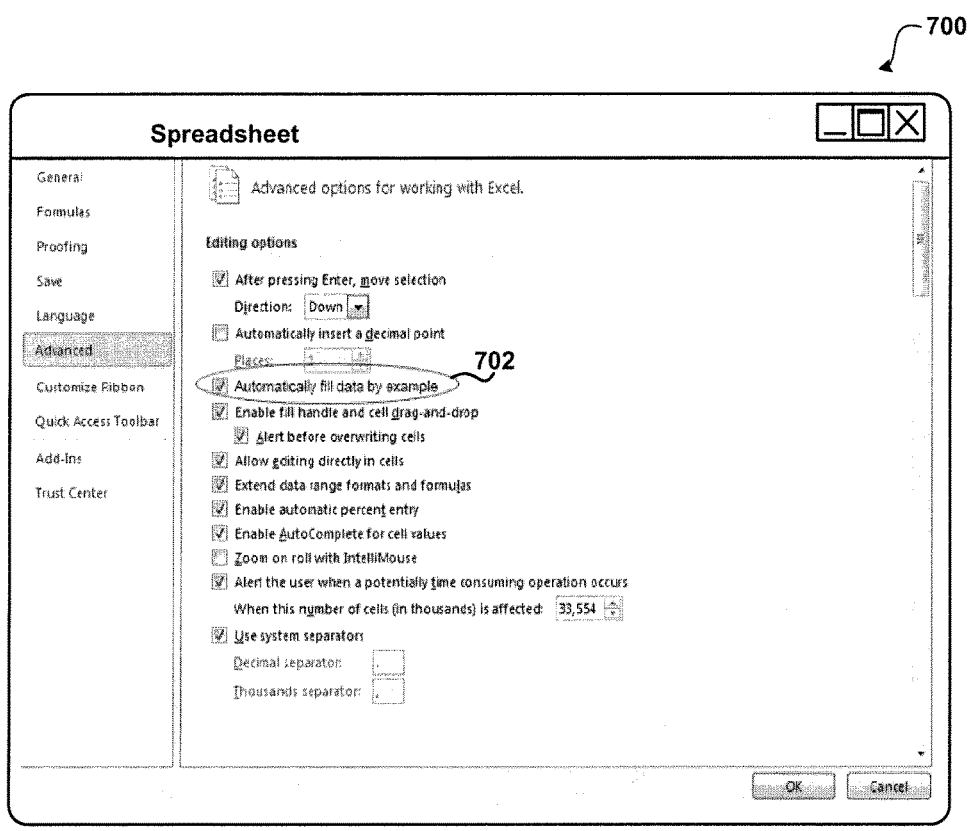
FIG. 7 shows a user interface for enabling/disabling fill by example.

FIG. 7 shows a user interface for enabling/disabling fill by example. Display 700 includes option 702 that allows a user to turn on/off the automatic filling of data by example. Other options may also be included within a user interface, such as desired number of edits/selections before obtaining a data formatting rule, whether to overwrite existing data with/without confirmation, and the like.

Figure 8:
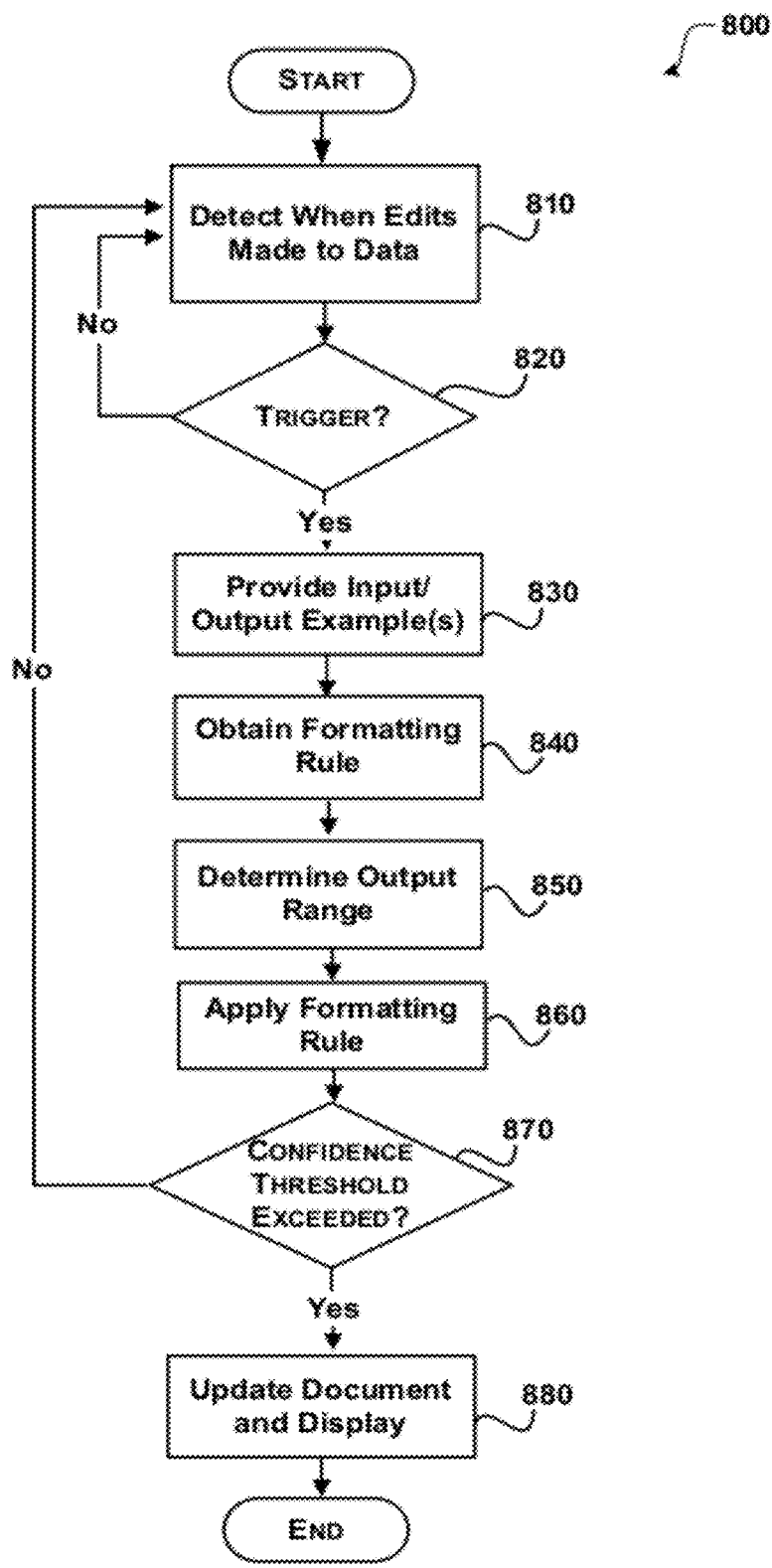
FIG. 8 shows an illustrative process for formatting data by example.

Referring now to FIG. 8, an illustrative process for formatting data by example will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 800 moves to operation 810, where edits that are made to data within a document are detected. The edits may be any edits to the document. According to an embodiment, the edits are to data that is contained within cells of a document (i.e. spreadsheet, table, list) that are a same type of data and are similarly formatted. Generally, each cell within a column may contain the same type of data (i.e. dates, addresses, names, numbers, and the like). The edits that are applied to each of the items fits a pattern that may be applied to other cells having the same type of item.

Moving to decision operation 820, a determination is made as to whether the number of edits has exceeded a predetermined number of edits and has triggered the process to obtain the data formatting rule that is to be applied to other similarly formatted cells. According to an embodiment, the number of edits to trigger obtaining a data formatting rule is two. The trigger point may be set to other values manually/automatically. For example, the trigger point may be based on a predicted accuracy of applying the data formatting rule to other similar data items within the document. In some cases the trigger point may be one, whereas others may be three or more.

When the trigger point has not been reached, the process returns to operation 810 to detect when further edits are made.

When the trigger point has been reached, the process flows to operation 830, where input/output examples are obtained and provided to a machine heuristic to obtain a data formatting rule. The input/output examples provide examples of data in a before state and an after state relating to the edits of data. For example, when the edits are to existing data, then the input examples are the data before editing and the output examples are the data after editing. When the edits are to a new cell, the output examples are the edited data in the cell and the input are the data related to creation of the output (e.g. one or more other columns of data).

Transitioning to operation 840, the data formatting rule is obtained. According to an embodiment, the data formatting rule is a function that receives textual input (e.g. from one or more cells) and produces zero or more results. The data formatting rule is directed at formatting other similar items within the document (e.g. the other cells within a column) to match the edits made by the user.

Moving to operation 850, the output range is determined. The output range identifies the items to which the data formatting rule is to be applied. For example, the other items may be all or a portion of the cells in a column in which items have been edited by a user and are the basis for the data formatting rule. In some examples, the output range are the cells within the column that are of the same item type (e.g. date, number, address, and the like). In other examples the output range are all the cells with values that are adjacent to each other, and that are adjacent to the edited cells.

Flowing to operation 860, the data formatting rule is applied to each of the items in the determined output range. Any results produced by applying the data formatting rule may be temporarily stored before making any changes to the document.

Transitioning to decision operation 870, a determination is made as to whether application of the data formatting rule resulted in accurate results. According to an embodiment, the accuracy is estimated by a number of results returned by the data formatting rule when applied to an item. When the number of results for an item is zero, the data formatting rule did not have enough data to generate a result. When the number of results is greater then one, the accuracy of the results may be questionable. When the number of results is one, then the result is likely accurate. The number/percentage of cells estimated to have an accurate result may be used to determine when a confidence threshold has been exceeded (e.g. >70%, 80%, 90%). When the confidence level is not exceeded, the process returns to operation 810 to detect more edits. Generally, the more examples obtained, the more accurate the results. When the confidence level is exceeded, the process flows to operation 880.

At operation 880, the document is updated with the results created by applying the data formatting rule to each of the items. For example, the cells having a single result are updated with the result. The cells having a different number of results may be marked with an error indicator as discussed above. A reviewing user interface element may also be displayed that allows a user to perform various operations relating to the application of the data formatting rule.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for formatting data based on edits, comprising:
   determining whether the edits have been made to a plurality of items within a first range of a document, wherein the plurality of items within the first range are related by a similar formatting, wherein the edits provide input examples of application of data formatting, and wherein the first range is located in a first column;
   in response to determining that the edits have been made to the plurality of items within the first range of the document and that the edits provide the input examples of application of data formatting:
   creating a data formatting rule based on the input examples for application to other items having the similar formatting within a second range of the document;
   automatically applying the data formatting rule to the other items having the similar formatting within the second range of the document;
   wherein when the first range is located in the first column, the second range is located in a second column offset at least one column from the first column; and
   displaying the other items reflecting the application of the data formatting rule.

2. The method of claim 1, wherein creating the data formatting rule comprises submitting information relating to each of the edits to a machine learning heuristic that creates the data formatting rule.

3. The method of claim 1, wherein the document is a spreadsheet document and wherein the edits are made to different cells within a same column of the spreadsheet document.

4. The method of claim 1, further comprising displaying a graphical user interface next to at least one of the other items formatted by the data formatting rule that when selected provides options for performing operations relating to the formatted item.

5. The method of claim 4, wherein displaying the graphical user interface comprises displaying a menu that comprises options for undoing the formatting, redoing the formatting, stopping the formatting, reviewing potential errors and ignoring errors.

6. The method of claim 1, further comprising displaying an indicator with a formatted item when a confidence level is below a predetermined threshold.

7. The method of claim 1, wherein determining whether the edits have been made to the plurality of items comprises determining whether the first column includes data having a value that is also included in the second column.

8. The method of claim 1, further comprising displaying a user interface element that allows the data formatting rule to be saved for later use.

9. A computer-readable storage medium, excluding a signal, storing computer-executable instructions for formatting data based on examples, comprising:
   determining output examples from a first plurality of items within an output range of a spreadsheet document, wherein the output range is a column or a row, and wherein each item of the first plurality of items includes output data;
   determining input examples from a second plurality of items within an input range of the spreadsheet document, wherein the input range does not include the output range, and wherein each item of the second plurality of items includes input data, wherein the input examples are determined based on the output data and the input data sharing a relationship associated with an application of data formatting;

automatically creating a data formatting rule based on the relationship between the output examples and the input examples;

automatically applying the data formatting rule to other items within the output range of the spreadsheet document that do not include data prior to applying the data formatting rule;

wherein the data formatting rule selects the input data from the input range and formats the input data according to the relationship to create formatted data to include in the other items; and displaying the other items reflecting the application of the data formatting rule.

10. The computer-readable storage medium of claim 9, wherein creating the data formatting rule comprises submitting information relating to each of the input examples and the output examples to a machine learning heuristic that creates the data formatting rule based on the input examples and the output examples.

11. The computer-readable storage medium of claim 9, further comprising displaying a graphical user interface next to at least one of the other items formatted by the data formatting rule that when selected provides options for reviewing formatting changes.

12. The computer-readable storage medium of claim 9, further comprising displaying a user interface element in the output range when a confidence level is below a predetermined threshold.

13. The computer-readable storage medium of claim 9, wherein determining the output examples comprises examining a first column that includes data values that are also included in a second column and a third column, wherein the second column and the third column are included in the input range.

14. The computer-readable storage medium of claim 9, further comprising displaying a user interface element that allows the data formatting rule to be saved for later use.

15. A system for formatting data based on edits, comprising:
a network connection that is configured to connect to a network;
a processor, memory, and a computer-readable storage medium, excluding a signal;
an operating environment stored on the computer-readable storage medium and executing on the processor;
a display;
a spreadsheet application;
a spreadsheet provided by the spreadsheet application, wherein the spreadsheet comprises items that are arranged in rows and columns; and
a formatting manager operating in conjunction with the spreadsheet application that is configured to perform actions comprising:
determining whether the edits have been made to a first plurality of items within a first range of the spreadsheet comprises one of a first column or a first row, wherein each item of the first plurality of items includes data, and wherein the edits provide input examples of a data formatting rule applied to the data of the first plurality of items;
automatically applying the data formatting rule to a second plurality of items within a second range of the spreadsheet that include other data having a same data type as the data of the first plurality of items, wherein when the first range comprises the first column, the second range comprises one or more columns offset from the first column by at least one column, and wherein when the first range comprises the first row, the second range comprises one or more rows offset from the first row by at least one row;
wherein an application of the data formatting rule formats the other data included in the second plurality of items to a format as defined by the edits made to the first plurality of items; and
displaying the other data included in the second plurality of items on the display reflecting the application of the data formatting rule.

16. The system of claim 15, further comprising displaying a graphical user interface next to at least one of item of the second plurality of items formatted by the data formatting rule that when selected provides options for reviewing formatting changes.

17. The system of claim 15, further comprising displaying a user interface element in the first range when a confidence level is below a predetermined threshold.

18. The system of claim 15, wherein the edits are determined to have been made to the first plurality of items when the first column is edited to include data that is also included in a second column and a third column.

19. The system of claim 15, further comprising displaying a user interface element that allows the data formatting rule to be saved for later use.

20. The system of claim 15, wherein the edits are determined to have been made to the first plurality of items when the first row is edited to include data also included in a second row and a third row.

* * * * *